United States Patent
Gallardo et al.

(10) Patent No.: US 12,455,045 B2
(45) Date of Patent: Oct. 28, 2025

(54) TANK COMPRISING INNER AND OUTER ENCLOSURES AND AT LEAST ONE ANNULAR LINEAR CONNECTION SYSTEM CONNECTING SAID ENCLOSURES

(71) Applicant: Airbus Operations SAS, Toulouse (FR)

(72) Inventors: Julien Gallardo, Toulouse (FR); Daniel Bellet, Toulouse (FR); François Loyant, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 18/596,317

(22) Filed: Mar. 5, 2024

(65) Prior Publication Data
US 2024/0301999 A1    Sep. 12, 2024

(30) Foreign Application Priority Data
Mar. 10, 2023   (FR) .................................. FR2302237

(51) Int. Cl.
*F17C 3/08*        (2006.01)
*F17C 13/08*       (2006.01)

(52) U.S. Cl.
CPC ............... *F17C 3/08* (2013.01); *F17C 13/08* (2013.01); *F17C 2223/0161* (2013.01)

(58) Field of Classification Search
CPC .......... F17C 2203/014; F17C 2203/018; F17C 13/08; F17C 13/086
See application file for complete search history.

(56) References Cited

U.S. PATENT DOCUMENTS

| | | | | |
|---|---|---|---|---|
| 3,425,585 | A | * | 2/1969 | Latham ................. F17C 13/083 220/560.12 |
| 3,692,206 | A | * | 9/1972 | Hornbeck ................ F17C 3/02 220/560.12 |
| 3,905,508 | A | * | 9/1975 | Hibl ...................... F17C 13/086 220/592.2 |
| 4,038,832 | A | * | 8/1977 | Lutgen ................. F17C 13/086 220/592.27 |

(Continued)

FOREIGN PATENT DOCUMENTS

| CN | 110566802 A | 12/2019 |
|---|---|---|
| EP | 3366568 A1 | 8/2018 |

(Continued)

OTHER PUBLICATIONS

French Search Report and Written Opinion for corresponding French Patent Application No. 2302237 dated Aug. 29, 2023.

*Primary Examiner* — Don M Anderson
(74) *Attorney, Agent, or Firm* — Greer, Burns & Crain, Ltd.

(57) ABSTRACT

A double-walled tank comprising at least one connection system connecting the outer and inner enclosures and enabling them to move in relation to one another in at least a longitudinal direction parallel to an axis of displacement when in operation. The connection system has an annular linear connection between a first contact surface rigidly connected to the outer enclosure and a second contact surface rigidly connected the inner enclosure, the first and second contact surfaces arranged opposite one another and configured to be in contact with one another along a contact circle that has a center positioned on the axis of displacement.

9 Claims, 6 Drawing Sheets

(56) References Cited

U.S. PATENT DOCUMENTS

| | | | | |
|---|---|---|---|---|
| 6,029,456 | A | * | 2/2000 | Zaiser ...................... F17C 3/08 |
| | | | | 62/51.1 |
| 7,284,674 | B2 | * | 10/2007 | Ueda ................... A47J 41/028 |
| | | | | 220/586 |
| 10,451,218 | B2 | * | 10/2019 | Strange ..................... F17C 3/08 |
| 2005/0139600 | A1 | * | 6/2005 | Harper ..................... F17C 1/00 |
| | | | | 220/560.13 |
| 2014/0166662 | A1 | * | 6/2014 | Snyder ................... F17C 13/00 |
| | | | | 220/560.1 |
| 2016/0305610 | A1 | * | 10/2016 | Karng ...................... F17C 3/08 |
| 2017/0113869 | A1 | * | 4/2017 | Zhou .................... B60P 3/2295 |
| 2017/0130900 | A1 | * | 5/2017 | Strange ..................... F17C 3/08 |
| 2023/0143288 | A1 | * | 5/2023 | Orchard ............... F17C 13/086 |
| | | | | 244/135 R |
| 2023/0272879 | A1 | * | 8/2023 | Gallardo .................. F17C 1/12 |
| | | | | 220/560.1 |
| 2024/0191843 | A1 | * | 6/2024 | Baer .................... F17C 13/084 |

FOREIGN PATENT DOCUMENTS

| | | |
|---|---|---|
| FR | 3064043 A1 | 9/2018 |
| NL | 8801044 A | 11/1989 |

\* cited by examiner

TANK COMPRISING INNER AND OUTER ENCLOSURES AND AT LEAST ONE ANNULAR LINEAR CONNECTION SYSTEM CONNECTING SAID ENCLOSURES

CROSS-REFERENCES TO RELATED APPLICATIONS

This application claims the benefit of French Patent Application Number 2302237 filed on Mar. 10, 2023, the entire disclosure of which is incorporated herein by way of reference.

FIELD OF THE INVENTION

The present application relates to a tank comprising inner and outer enclosures and at least one annular linear connection system connecting said enclosures.

BACKGROUND OF THE INVENTION

According to an embodiment shown in FIG. 1, a hydrogen tank 10 in the prior art comprises an outer enclosure 12, an inner enclosure 14 positioned inside the outer enclosure 12, thermal insulation between the outer and inner enclosures 12, 14, and two diametrically opposed connection systems 16, 16' connecting the outer and inner enclosures 12, 14. In operation, on account of the temperature required to store hydrogen in cryogenic state, the inner enclosure 14 contracts much more than the outer enclosure 12. Consequently, at least one of the two connection systems 16 is designed to enable the inner enclosure 14 to move in relation to the outer enclosure 12 in a longitudinal direction parallel to an axis of displacement DD. Usually, a first connection system 16' (the system on the left-hand side in FIG. 1) is rigid and does not allow any relative movement between the outer and inner enclosures 12, 14, whereas a second connection system 16 (the system on the right-hand side in FIG. 1) enables relative movement between the outer and inner enclosures 12, 14 in the longitudinal direction.

As shown in FIGS. 1 and 2, the second connection system 16 comprises a female sleeve 18.1 rigidly connected to the outer enclosure 12 and a male sleeve 18.2 connected to the inner enclosure 14 by a rigid connection designed to slide inside the female sleeve 18.1. The female sleeve 18.1 and the male sleeve 18.2 respectively have coaxial inner and outer cylindrical surfaces that have axes coincident with the axis of displacement DD and that are of substantially the same diameter. The female sleeve 18.1 and the male sleeve 18.2 thus form a sliding pivot connection.

This embodiment is not entirely satisfactory on account of the risk of jamming caused by friction between the female sleeve 18.1 and the male sleeve 18.2, as well as the random nature of the contacts between the female sleeve 18.1 and the male sleeve 18.2.

SUMMARY OF THE INVENTION

The present invention is intended to overcome some or all of the drawbacks in the prior art.

For this purpose, the invention relates to a tank comprising an outer enclosure, an inner enclosure positioned inside the outer enclosure and at least one connection system connecting the outer and inner enclosures and enabling them to move in relation to one another in at least a longitudinal direction parallel to an axis of displacement when in operation.

According to the invention, the connection system comprises an annular linear connection having a first contact surface rigidly connected to a first element that is the outer enclosure or the inner enclosure as well as a second contact surface rigidly connected to a second element that is different from the first element and that is the outer enclosure or the inner enclosure, the first and second contact surfaces being arranged opposite one another and designed to be in contact with one another along a contact circle that has a center positioned on the axis of displacement.

The annular linear connection limits the risk of jamming and enables swiveling between the first and second contact surfaces, which tends to limit the bending stresses in the connection system. According to another advantage, the position of the contact zone between the first and second contact surfaces is no longer random.

According to another feature, the first contact surface has constant longitudinal sections about the axis of displacement and cross sections that increase or decrease as they move away from a transverse plane passing through the center of the contact circle, the second contact surface being cylindrical and having an axis of revolution coincident with the axis of displacement.

According to another feature, the first contact surface has cross sections equal to or greater than the cross sections of the second contact surface and cross sections that increase as they move away from the transverse plane passing through the center of the contact circle.

According to another feature, the connection system comprises a first cylindrical sleeve that is connected to the outer enclosure and a second cylindrical sleeve that is connected to the inner enclosure, the first and second sleeves being coaxial with the axis of displacement and spaced apart from one another such as to delimit an annular seat therebetween. Additionally, the connection system comprises a ring that is positioned in the annular seat and that is stationary in relation to a first element that is the first or second sleeve, the ring including the first contact surface, a second element that is different from the first element and that is the first or second sleeve including the second contact surface.

According to another feature, the second sleeve has an outer surface that is coaxial with the axis of displacement and that includes a zone positioned in the first sleeve, said zone forming the second contact surface. The first sleeve has an inner surface including at least a first cylindrical segment that is coaxial with the axis of displacement, is positioned about the second sleeve and has an internal diameter. Additionally, the ring comprises an outer cylindrical surface having an external diameter substantially equal to the internal diameter of the first segment of the first sleeve, as well as an inner surface forming the first contact surface.

According to another feature, the connection system comprises first and second stops connected to the first sleeve and positioned on both sides of the ring in the longitudinal direction to prevent the translational movement thereof in the longitudinal direction in relation to the first sleeve.

According to another feature, the second stop, which is furthest away from the inner enclosure, is removable.

According to another feature, the ring extends between two transverse planes and has a plane of symmetry equidistant from the transverse planes.

According to another feature, the first sleeve traverses the outer enclosure and has a first open end that is located inside the outer enclosure and a second open end that is located outside the outer enclosure.

According to another feature, the connection system comprises a stopper designed to be positioned at the second end of the first sleeve and to be in a mounted state in which the stopper plugs the second end of the first sleeve and in a disassembled state in which the stopper leaves the second end of the first sleeve open.

BRIEF DESCRIPTION OF THE DRAWINGS

Other features and advantages are set out in the description of the invention below, given purely by way of example and with reference to the attached drawings, in which.

DETAILED DESCRIPTION OF THE PREFERRED EMBODIMENTS

Figure 1:
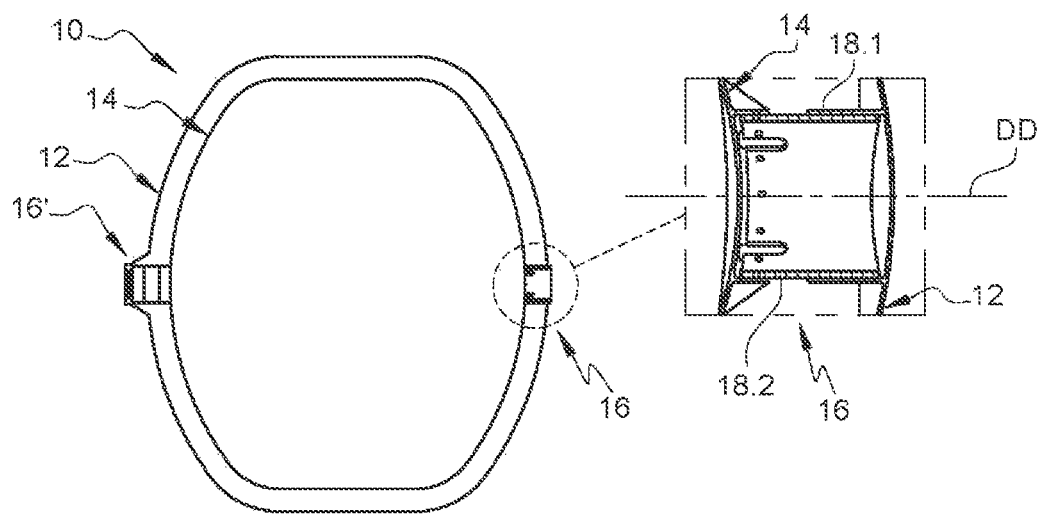
FIG. 1 is a schematic representation of a tank and a connection system showing an embodiment of the prior art.
Figure 2:
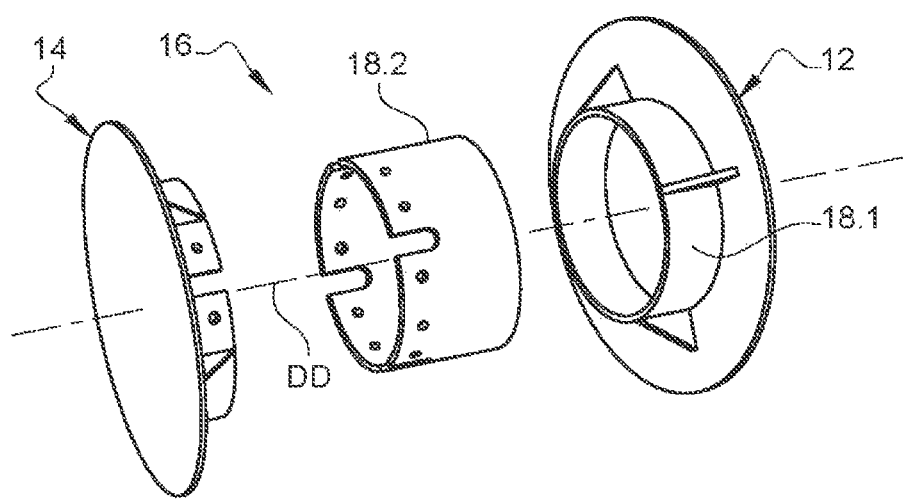
FIG. 2 is a perspective view of a connection system in a disassembled state showing an embodiment of the prior art.
Figure 3:
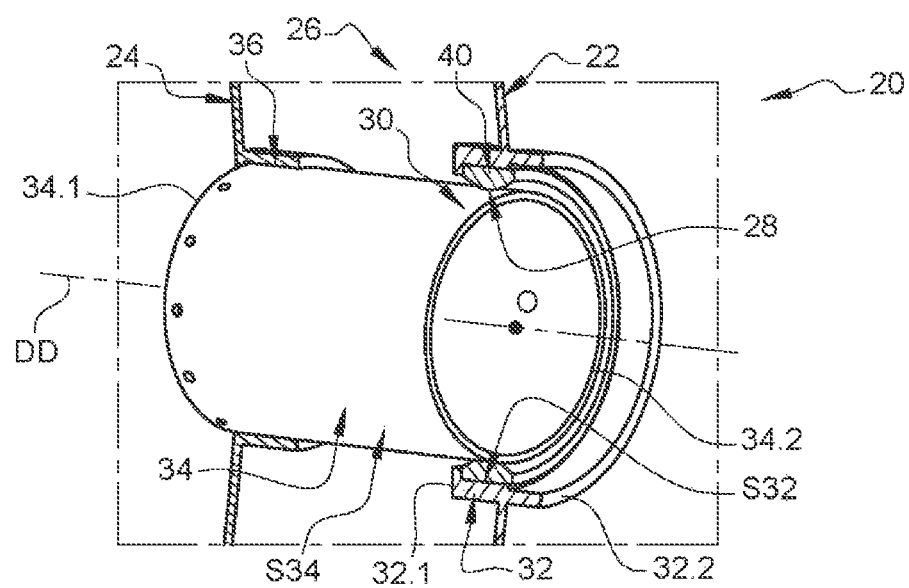
FIG. 3 is a perspective view of a portion of a tank and of a connection system showing an embodiment of the invention.
Figure 4:
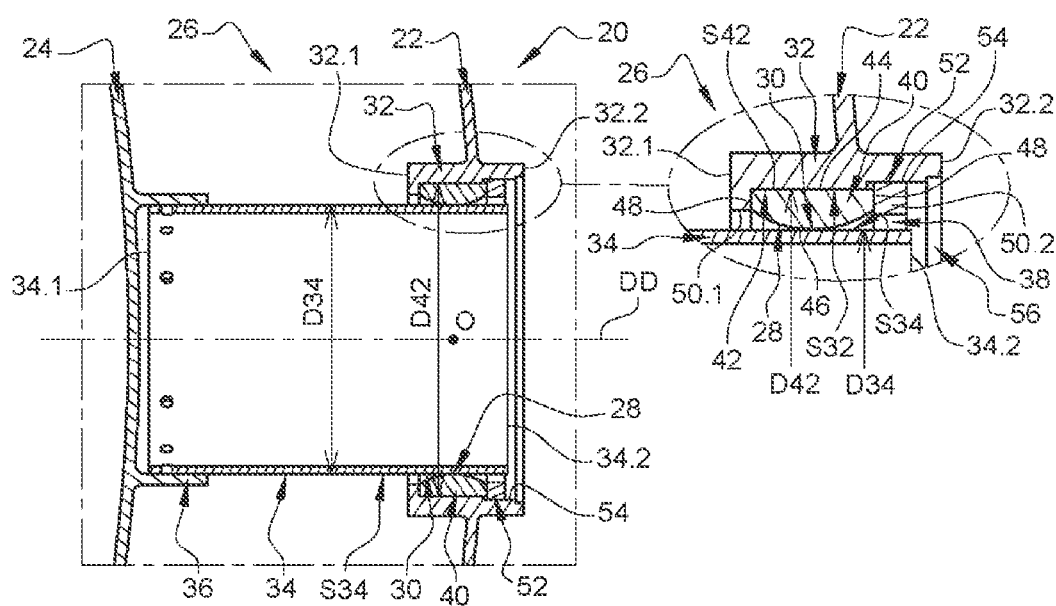
FIG. 4 is a longitudinal cross section of a portion of a tank and of a connection system showing an embodiment of the invention.
Figure 5:
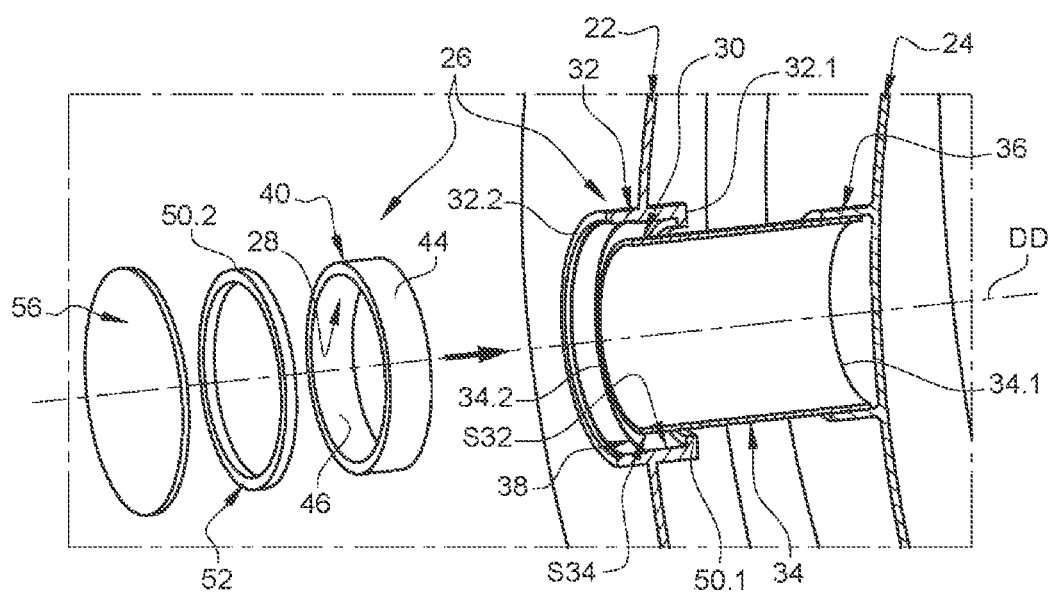
FIG. 5 is a perspective view of the tank portion and of the connection system shown in FIG. 4, during assembly.

According to an embodiment shown in FIGS. 3 to 5, a tank 20 comprises an outer enclosure 22, an inner enclosure 24 positioned inside the outer enclosure 22, and diametrically opposed first and second connection systems 26 connecting the outer and inner enclosures 22, 24.

According to one application, the tank 20 is designed to store hydrogen in cryogenic state in the inner enclosure 24. According to this application, the tank 20 comprises thermal insulation between the outer and inner enclosures 22, 24.

The outer and inner enclosures and the thermal insulation are not described further since they may be identical to those of the prior art.

According to a first configuration, the second connection system is rigid and identical to the rigid connection system in the prior art. According to a second configuration, the first and second connection systems 26 are identical.

In operation, the outer and inner enclosures 22, 24 can move in relation to one another in a longitudinal direction parallel to an axis of displacement DD as a result of different expansion phenomena of the outer and inner enclosures 22, 24.

In the remainder of the description, a transverse plane is a plane perpendicular to the axis of displacement DD. A longitudinal plane contains the axis of displacement DD.

Regardless of the embodiment, the tank comprises outer and inner enclosures 22, 24 and at least one connection system 26 connecting the outer and inner enclosures 22 and 24 and enabling them to move in relation to one another in at least a longitudinal direction parallel to an axis of displacement DD when in operation.

Only the portion of the tank 20 including the first connection system 26 is shown in FIGS. 3 to 5.

The connection system 26 comprises a first contact surface 28 rigidly connected to a first element that is the outer enclosure 22 or the inner enclosure 24, a second contact surface 30 rigidly connected to a second element that is different from the first element and that is the outer enclosure 22 or the inner enclosure 24, the first and second contact surfaces 28, 30 being arranged opposite one another and designed to be in contact with one another along a contact circle that has a center O positioned on the axis of displacement DD. The first and second contact surfaces 28, 30 are positioned between two transverse planes that are offset in relation to one another in the longitudinal direction.

Thus, the connection system 26 comprises an annular linear connection between the outer and inner enclosures 22, 24 immobilizing them in relation to one another in a transverse plane passing through the center O and enabling a translational movement along the axis of displacement DD as well as swiveling about the center O between the outer and inner enclosures 22, 24. The first and second contact surfaces 28, 30 are designed to be in contact with one another along the contact circle when there is no swiveling. Any swiveling that occurs may result in a slight deformation of the contact circle. This deformation is however very limited since the maximum anticipated swiveling is in the order of approximately 1°.

Providing a connection system 26 including an annular linear connection limits the risk of jamming and enables swiveling between the first and second contact surfaces 28, 30, which tends to limit the bending stresses in the connection system 26. According to another advantage, the position of the contact zone between the first and second contact surfaces 28, 30 is no longer random. This contact zone is still located at a contact circle having a center O positioned on the axis of displacement DD.

According to one embodiment, the first contact surface 28 has constant longitudinal sections (in longitudinal planes) about the axis of displacement DD and that are U- or V-shaped, and variable cross sections that either decrease or increase as they move away from a transverse plane passing through the center O. The first contact surface 28 is substantially (i.e., +/−10%) symmetrical about a transverse plane passing through the center O.

Additionally, the second contact surface 30 is cylindrical and has an axis of revolution coincident with the axis of displacement DD.

According to one arrangement, the first contact surface 28 is positioned outside the second contact surface 30 and has cross sections equal to or greater than the cross sections of the second contact surface 30. The first contact surface 28 has cross sections that increase as they move from the transverse plane passing through the center O.

According to one configuration, the first contact surface 28 is rigidly connected to the outer enclosure 22 and the second contact surface 30 is rigidly connected to the inner enclosure 24.

According to one embodiment, the connection system 26 comprises a first cylindrical sleeve 32 connected to the outer enclosure 22. According to one configuration, the first sleeve 32 comprises a first end connected to the outer enclosure 22 and a second end oriented towards the inner enclosure 24, said first end being plugged by the outer enclosure 22. According to another configuration shown in FIGS. 3 to 5, the first sleeve 32 traverses the outer enclosure 22 and has a first open end 32.1 located inside the outer enclosure 22 and oriented towards the inner enclosure 24, and a second end 32.2 located outside the outer enclosure 22. The second end 32.2 may be open or closed. According to an arrangement shown in FIGS. 3 to 5, the outer enclosure 22 and the first sleeve 32 form a single integral part. According to another arrangement, the outer enclosure 22 and the first sleeve 32 are two separate parts connected by a rigid connection.

Additionally, the connection system 26 comprises a second cylindrical sleeve 34 that has a first end 34.1 connected to the inner enclosure 24 and a second end 34.2 oriented towards the outer enclosure 22. According to one configuration, the second sleeve 34 and the inner enclosure 24 form a single integral part. According to another configuration, the second sleeve 34 and the inner enclosure 24 are two separate parts connected by a rigid connection 36 obtained by bonding, welding or using connection elements such as bolts or rivets, for example. This rigid connection 36 is not described further since it can be identical to those found in the prior art.

According to one configuration, the first and second sleeves 32, 34 are coaxial with one another and with the axis of displacement DD, and are spaced apart from one another such as to delimit an annular seat 38 therebetween. Additionally, the connection system 26 comprises a ring 40 that is positioned in the annular seat 38 and interposed between the first and second sleeves 32, 34, said ring 40 being stationary in relation to a first element that is the first or second sleeve 32, 34 and including the first contact surface 28, a second element that is different from the first element and that is the first or second sleeve 32, 34 including the second contact surface 30 in contact with the first contact surface 28.

According to one embodiment, the first sleeve 32 is a female sleeve in which a portion of the second sleeve 34, which forms a male sleeve, is positioned. According to this embodiment, the second sleeve 34 has an outer surface S34 that is coaxial with the axis of displacement DD and that includes a contact zone adjacent to the second end 34.2 positioned in the first sleeve 32 and forming the second contact surface 30. The outer surface S34 has an external diameter D34. The first sleeve 32 has an inner surface S32 including at least a first cylindrical segment 42 that is coaxial with the axis of displacement DD, is positioned about the second sleeve 34 and has an internal diameter D42. Additionally, the ring 40 comprises an outer cylindrical surface 44 that is coaxial with the axis of displacement DD and has an external diameter substantially equal to the internal diameter D42 of the first segment 42 of the first sleeve 32, as well as an inner surface 46 forming the first contact surface 28 in contact with the contact zone of the second sleeve 30. According to one arrangement, the ring 40 comprises two lateral walls 48 that are positioned approximately in transverse planes connecting the outer surface 44 and the inner surface 46. In a variant, the outer surface 44 and the inner surface 46 may be connected to each other directly. Regardless of the variant, the ring 40 extends between two transverse planes and has a plane of symmetry equidistant from the transverse planes.

According to one embodiment, the first and second sleeves 32, 34 are made of metal or a composite material. The ring 40 is made of a ceramic material or a metal material. The ring 40 is made of a material having a high hardness greater than the hardness of the material used to make the second sleeve 34.

According to another embodiment, the ring 40 is made of metal or a composite material. The first and second sleeves 32, 34 are made of a ceramic material or a metal material. The second sleeve 34 is made of a material having a high hardness greater than the hardness of the material used to make the ring 40.

Figure 6:
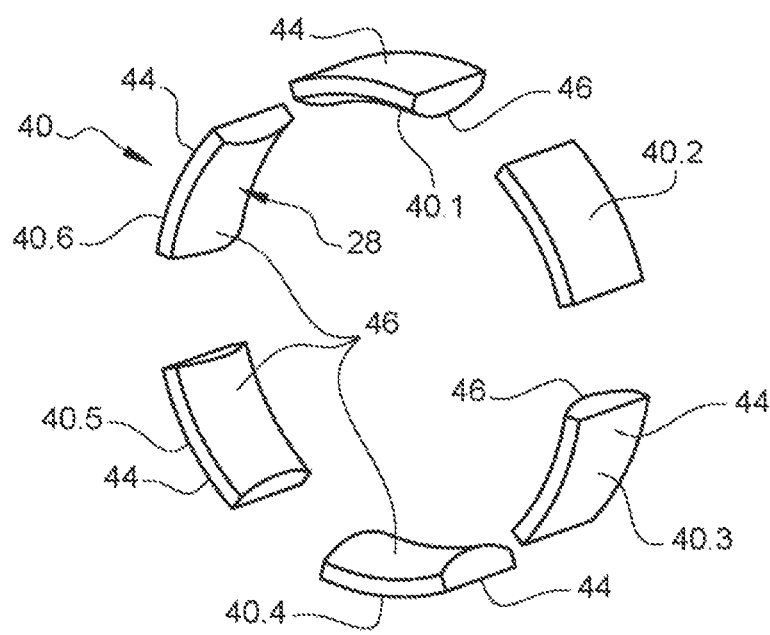
FIG. 6 is a perspective view of a segmented ring showing an embodiment of the invention.

According to a first configuration shown in FIGS. 3 and 5, the ring 40 is continuous and extends about the entire circumference of the first sleeve 32. According to a second configuration shown in FIG. 6, the ring 40 is segmented and comprises several segments 40.1 to 40.6 spaced apart from one another and regularly distributed about the circumference of the first sleeve 32. This second configuration limits heat transfers between the ring 40 and the second sleeve 34, which helps to improve the thermal performance of the tank.

The connection system 26 comprises first and second stops 50.1, 50.2 connected to the first sleeve 32 and positioned on both sides of the ring 40 in the longitudinal direction to prevent the translational movement thereof in the longitudinal direction in relation to the first sleeve 32. The second stop 50.2, which is furthest away from the inner enclosure 24, is removable.

According to one embodiment, the first stop 50.1 is positioned at the first end 32.1 of the first sleeve 32. The first sleeve 32 and the first stop 50.1 form a single integral part. The first stop 50.1 is an inner flange with an internal diameter less than the internal diameter D42 of the first segment 42. The second stop 50.2 is a nut 52 screwed into the first sleeve 32. For this purpose, the first sleeve 32 comprises a second threaded segment 54 that is configured to enable screwing of the nut 52, which extends between the second end 32.2 and the first segment 42 of the first sleeve 32. The second segment 54 is coaxial with the first segment 42 and has a diameter greater than the diameter of the first segment 42.

According to one embodiment, the connection system 26 comprises a stopper 56 designed to be positioned at the second end 32.2 of the first sleeve 32 and to be in a mounted state in which the stopper 56 plugs the second end 32.2 of the first sleeve 32 and in a disassembled state in which the stopper 56 leaves the second end 32.2 of the first sleeve 32 open. The stopper 56 and the second end 32.2 of the first sleeve 32 are configured to hold the stopper 56 in the mounted state.

Providing a first sleeve 32 that opens outside the outer enclosure 22 provides access to the elements of the connection system 26 without having to disassemble the outer enclosure 22. In the mounted state, the stopper 56 seals the zone between the outer enclosure 22 and the inner enclosure 24.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A tank comprising:
   an outer enclosure,
   an inner enclosure positioned inside the outer enclosure,
   and at least one connection system connecting the outer and inner enclosures and configured to enabled the outer and inner enclosures to move in relation to one another in at least a longitudinal direction parallel to an axis of displacement when in operation,
   wherein the connection system comprises an annular linear connection having a first contact surface rigidly connected to a first element that is the outer enclosure or the inner enclosure and a second contact surface rigidly connected to a second element that is different from the first element and that is the outer enclosure or the inner enclosure, the first and second contact surfaces being arranged opposite one another and configured to be in contact with one another along a contact circle that has a center positioned on the axis of displacement, wherein the first contact surface has constant longitudinal sections about the axis of displacement and cross sections that increase or decrease as the cross sections move away from a transverse plane passing through the center of the contact circle, and wherein the second contact surface is cylindrical and has an axis of revolution coincident with the axis of displacement.

2. The tank according to claim 1, wherein the first contact surface has cross sections equal to or greater than the cross sections of the second contact surface and cross sections that increase as the second cross sections move away from the transverse plane passing through the center of the contact circle.

3. The tank according to claim 1, wherein the connection system comprises a first cylindrical sleeve as the first element connected to the outer enclosure and a second cylindrical sleeve as the second element connected to the inner enclosure, the first and second cylindrical sleeves being coaxial with the axis of displacement and spaced apart from one another such as to delimit an annular seat therebetween, and wherein the connection system further comprises a ring positioned in the annular seat and being stationary in relation to a first element that is the first or second cylindrical sleeve, the ring including the first contact surface, a second element that is different from the first element and that is the first or second cylindrical sleeve including the second contact surface.

4. The tank according to claim 3, wherein the second cylindrical sleeve has an outer surface coaxial with the axis of displacement and includes a zone positioned in the first cylindrical sleeve, said zone forming the second contact surface, wherein the first cylindrical sleeve has an inner surface including at least a first cylindrical segment that is coaxial with the axis of displacement, positioned about the second cylindrical sleeve and has an internal diameter; and wherein the ring comprises an outer cylindrical surface having an external diameter substantially equal to the internal diameter of the first segment of the first cylindrical sleeve and an inner surface forming the first contact surface.

5. The tank according to claim 4, wherein the connection system comprises first and second stops connected to the first cylindrical sleeve and positioned on both sides of the ring in the longitudinal direction to prevent a translational movement thereof in the longitudinal direction in relation to the first cylindrical sleeve.

6. The tank according to claim 5, wherein the second stop, which is furthest away from the inner enclosure, is removable.

7. The tank according to claim 3, wherein the ring extends between two transverse planes and has a plane of symmetry equidistant from the transverse planes.

8. The tank according to claim 3, wherein the first cylindrical sleeve traverses the outer enclosure and has a first open end that is located inside the outer enclosure and a second open end that is located outside the outer enclosure.

9. The tank according to claim 8, wherein the connection system comprises a stopper configured to be positioned at the second end of the first cylindrical sleeve and to be in a mounted state in which the stopper plugs the second end of the first cylindrical sleeve and in a disassembled state in which the stopper leaves the second end of the first cylindrical sleeve open.

* * * * *